United States Patent [19]

Popovich et al.

[11] 4,169,460

[45] Oct. 2, 1979

[54] SOLAR CONVERTER SYSTEM WITH THERMAL OVERLOAD PROTECTION

[76] Inventors: John M. Popovich, 1717 W. Alameda St., Burbank, Calif. 91506; Thomas R. Thornbury, 1942 Crestshire Dr., Glendale, Calif. 91208

[21] Appl. No.: 762,667

[22] Filed: Jan. 26, 1977

[51] Int. Cl.² ............................................. F24J 3/02
[52] U.S. Cl. .................................. 126/422; 237/1 A; 137/59; 126/450; 126/437
[58] Field of Search ............... 126/270, 271; 237/1 A, 237/66, 80; 137/59, 60, 61, 62

[56] References Cited

U.S. PATENT DOCUMENTS

| 3,107,052 | 10/1963 | Garrison | 126/271 |
| 3,939,819 | 2/1976 | Minardi | 126/271 |
| 3,986,489 | 10/1976 | Schlesinger | 126/271 |
| 4,044,754 | 8/1977 | Cronin et al. | 126/271 |
| 4,048,981 | 9/1977 | Hobbs | 126/271 |
| 4,055,163 | 10/1977 | Costello et al. | 126/271 |

FOREIGN PATENT DOCUMENTS 2305697  10/1976  France .................................. 126/271

*Primary Examiner*—James C. Yeung
*Attorney, Agent, or Firm*—William W. Haefliger

[57] ABSTRACT

A solar energy conversion system comprises:
(a) a solar converter in which liquid absorbs solar radiation, the liquid being solar energy absorptive,
(b) first means to circulate said liquid for flow through the converter, and
(c) means to effect removal of liquid from the converter in response to an undesirable operation condition in said system.

12 Claims, 6 Drawing Figures

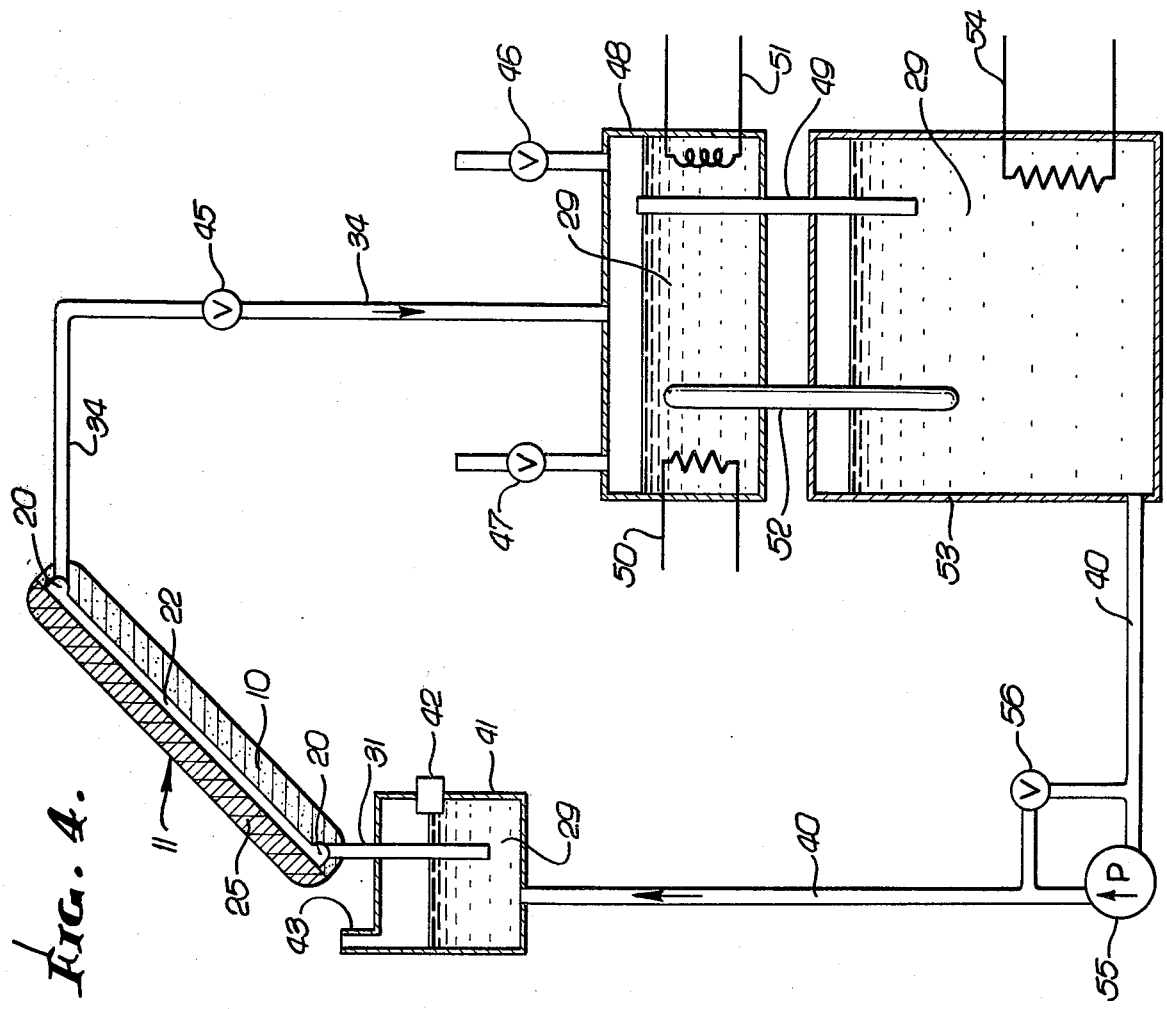
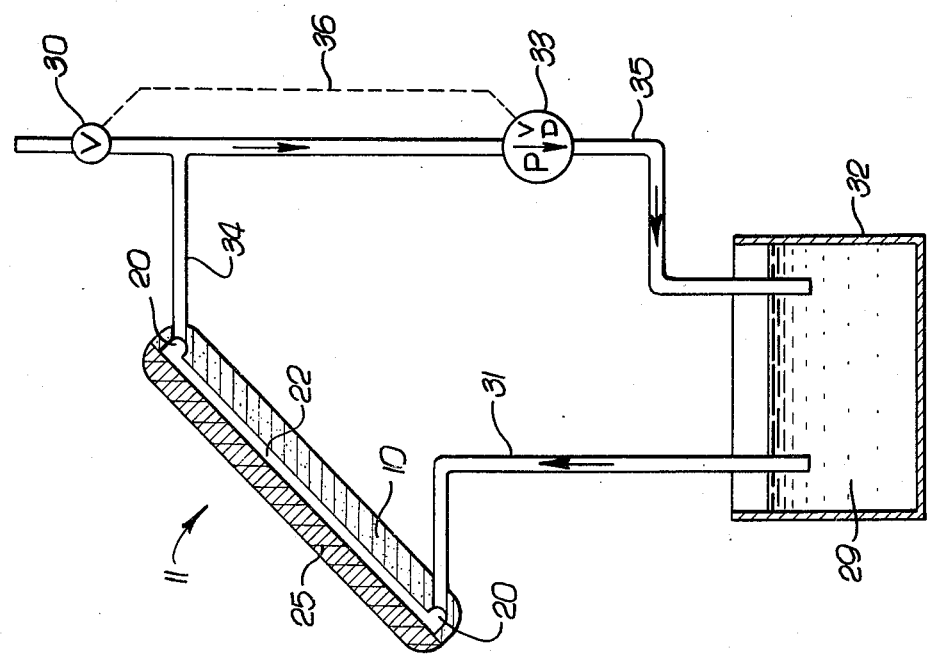

SOLAR CONVERTER SYSTEM WITH THERMAL OVERLOAD PROTECTION

BACKGROUND OF THE INVENTION

This invention relates to the collection of solar energy for conversion to thermal, electrical or chemical energy. In one mode of operation, solar energy directly heats an absorptive liquid for thermal related processes. Since the liquid itself, is exposed to solar radiation, photo chemical, photoelectrical, photoelectrochemical and photobiological processes are also permitted.

At present, the use of solar energy devices for thermal purposes is severely restricted because of (a) their relatively poor thermal efficiency, (b) the relatively high cost of producing them, and (c) the problems encountered by them under no-flow conditions. Most of the solar thermal devices developed over the past century rely on a metal absorber plate which is heated by the sun's radiation. A fluid confined in a metal flow path is circulated past the absorber plate, indirectly heating the fluid and cooling the plate, and the heat acquired by the fluid is then used for energy related purposes. The fluid generally operates at a pressure several times greater than atmospheric, requiring strong, heavy materials for the fluid flow path. Under no-flow conditions the absorber plate can be heated by the sun to temperatures exceeding 500° F., requiring high temperature materials throughout the device. The extreme temperature range the device must accommodate creates problems in thermal expansion, damage and limited service life. Many solar thermal devices suffer from problems relating to boiling or freezing of the working fluid and chemical attack on the fluid path elements by the working fluid. All of these problems demand the use of expensive, high performance materials and designs.

Poor thermal efficiency of most current designs relates to (a) poor heat conductance from the absorber to the working fluid, (b) partial coverage of the absorber plate by the working fluid, (c) high convective and radiative heat losses during operation, and (d) the high heat capacitance of the materials used causes poor thermal response.

Since most current solars thermal devices do not expose the working fluid to the direct radiation of the sun, they do not adapt to photo-effect processes such as photoelectric and photochemical processes.

SUMMARY OF THE INVENTION

It is the object of the present invention to provide a solar energy conversion system that overcomes the problems and limitations of past systems. Such a system is provided by a solar converter in which liquid directly absorbs solar radiation, the liquid being solar energy absorptive, with a first means to circulate said liquid for flow through the converter and a means to effect removal of liquid from the convertor in response to an undesired operating condition in the system. One example of such system is comprised of a solar convertor with a base and an extended surface thereon to face the sun, said surface being reflective and located rearward of the path of said liquid, with a structure at the front side of said surface to pass solar radiation, together with a pump and liquid rerservoir in communication with the converter, and an element operable to admit air into the convertor to effect liquid drainage. The said structure may be a cellular honeycomb material which is transparent to solar radiation and the converter may be located on the suction side of the pump to provide a subatmospheric, distributed flow of liquid over said surface. The said element may be a valve which is operatively connected to the pump, draining the liquid from the convertor under no-flow condition.

The present invention surmounts the aforementioned problems by greatly reducing the maximum temperature and pressure differentials to which the solar convertor is subjected. No part of the convertor ever exceeds the maximum temperature of the liquid. Under no-flow conditions, the absorbing liquid is not exposed to the sun and said surface may be sufficiently reflective to prevent excess temperature build-up. The reduced maximum temperature permits the use of less expensive materials and designs throughout the convertor. For example, organic materials can be used in said structure for fabricating a honeycomb that suppresses convective and radiative heat losses. When sub-atmospheric pressure is used in the convertor, the maximum pressure differential can be greatly reduced, permitting greater materials choices and design freedom. Since the stresses applied to fluid path elements may be compressive, it is easy to use large plates or sheets for the fluid path within the convertor. Full coverage of the converter liquid cavity is readily achieved by the absorptive liquid to maximize radiation absorbed. Since the liquid directly absorbs the radiation, any problem with heat conductance is eliminated. Thermal overload protection may be insured by connecting said valve to cause the converter to drain under no-flow conditions. Thermal overload protection against liquid boiling is also provided, since liquid automatically drains. Service life of the converter can be greatly extended since temperature and pressure extremes are reduced.

DRAWING DESCRIPTION

FIG. 3 is a side elevation, showing converter in section and means for circulating fluid and means for preventing thermal overload, the combination embodying an example of the invention;

FIG. 4 is a schematic of a system embodying the invention in combination with an example of a thermal storage system;

DETAILED DESCRIPTION

The invention basically consists of a solar converter which exposes an absorptive liquid to solar radiation, a means to circulate the liquid to and from the convertor, and a means to drain the liquid from the converter in the event of an undesireable operating condition in the system.

Figure 1:
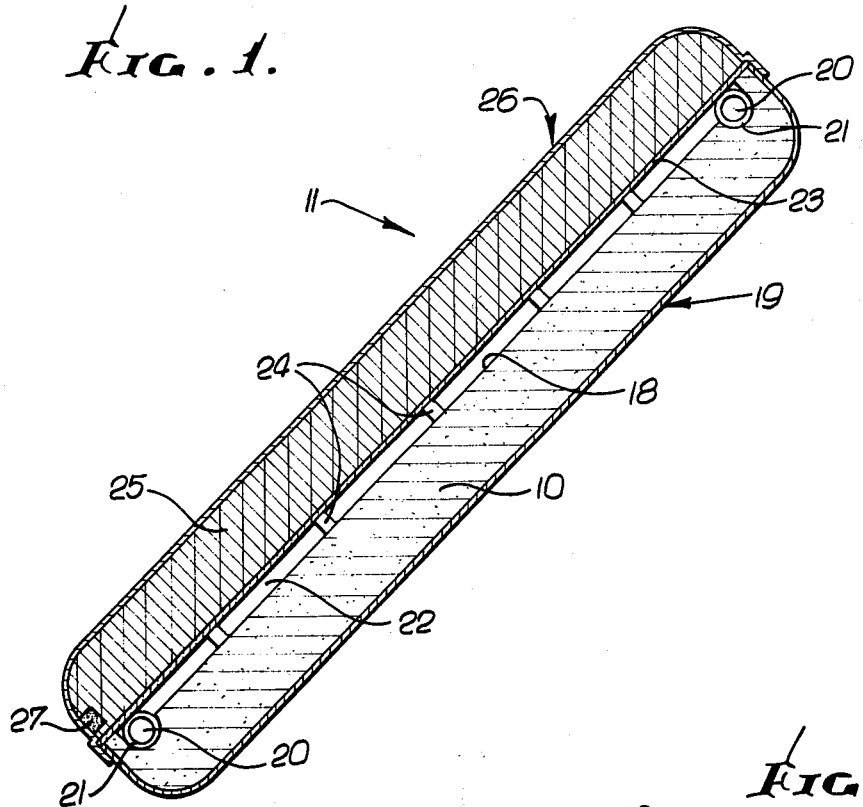
FIG. 1 is a side elevation in section, showing a solar converter which could be used in the invention.
Figure 2:
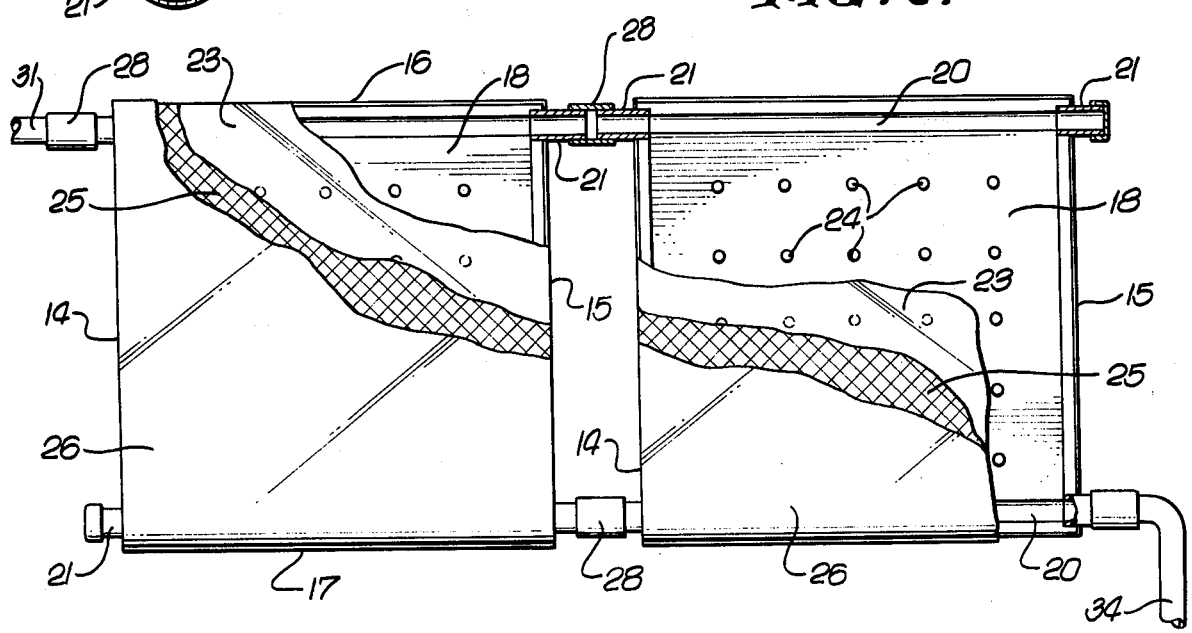
FIG. 2 is a frontal view showing multiple converters connected in parallel.

FIGS. 1 and 2 show one example of a planar converter, although it is understood that converters of other geometry could be equally suitable. In FIGS. 1 and 2 the base 10 of the converter 11 may consist of a highly insulative material, such as foamed plastic, glass fibers, a cellular structure, or an air space and may be enclosed by a back 19, all materials may be relatively lightweight, inexpensive and readily formed to shape. The base, of rectangular outline, has opposite sides 14 and 15, top 16, bottom 17, front 18, and back 19. In one embodiment, the front surface 18 is reflective to prevent heat build up in the converter when liquid is not present. The front surface 18 may have a formed liquid manifold 20 extending the full width of the base 10 near the top 16 and near the bottom 17 of the converter 11. The manifold 20 may be joined by a pipe 21 where it protrudes through the sides 14 and 15 of the converter 11, and can communicate liquid into and out of the fluid path 22.

The sheet 23 consists of a transparent material such as glass or plastic and may be separated from surface 18 by spacers 24 or vertical sides, either of which could be integral to surface or sheet 23 or affixed thereto. A cellular structure 25 may overly sheet 23 and may be a grid work, such as a honeycomb, of thin transparent plastic material. A top cover 26 of a transparent material such as glass or plastic overlies the cellular structure 25 and may be affixed to the base 10. A desicant 27 may be enclosed within the converter to reduce moisture build up.

It is understood that many variations of the examples shown in FIGS. 1 and 2 are possible without changing the scope or spirit of the invention. For example, the surfaces of the top cover 26 and sheet 23 may have special preparation such as acid etching to improve solar transmission. It is not necessary for the cellular structure 25 to be in intimate contact with cover 26 or sheet 23 at all edges of the grid to be effective in suppressing heat losses or supporting structural loads. The cell size and shape in structure 25 may be any suitable configuration for reduction of convection and radiation losses. The air space in structure 25 may also be evacuated or filled with a refrigerant type gas that undergoes phase change within the operating temperature range of the converter. The top cover 26 may be exposed to the direct rays of the sun or to reflected or concentrated radiation from adjacent devices. The path 22 of liquid flow through the converter may be confined by surface 18 and sheet 23 when they are peripherally sealed. All materials between and including surface 18 and back 19 may be transparent to allow exposure of both sides of the liquid path 22 to radiation.

The converters may be constructed to allow several of them to be interconnected as in FIG. 2. One means to interconnect them may use a shrinkable coupling 28 with internal sealant to connect adjoining pipes 21 of adjacent converters. Couplings may also act as an expansion joint and allow slight convertor misalignment.

FIG. 3 shows one example of a suitable means for causing liquid to flow through the converter 11. An inlet duct 31 conveys fluid 29 from a reservoir 32 through pipe 21 into fluid manifold 20. A variable delivery pump 33 draws fluid 29 out of the converter through outlet duct 34, causing liquid within fluid path 22 to be under sub-atmospheric pressure. The liquid is returned to the reservoir 32 through duct 35. The valve 30 may be of the normally open type and operably connected 36 to pump 33, duct 34 or duct 35 to close when the pump is actuated to provide liquid flow.

It is understood that may variations of the system elements in FIG. 3 are possible within the scope of the invention. For example, ducts 31 and 35 may communicate with different reservoirs of different configurations and altitudes. Valve 30 may be actuated in response to a no-flow condition in fluid cavity 22 by any suitable means, causing it to open and permit liquid to drain from the converter. The pump 33 may be replaced by reservoirs at different altitudes effecting a siphon through the fluid cavity of the converter. Flow rate control of the liquid can be effected by varying pump delivery rate, flow restricters in the ducts or varying the altitude of the reservoirs. Drainage rate of liquid from the converter can be varies by flow restricters in the ducts or valve 30.

The liquid 29 is highly absorptive to solar radiation and may be a water based liquid containing suspended carbon particles or any other suitable agent. A series of convertors may be interconnected as in FIG. 2 such that fluid may be pumped through several collectors simultaneously by one pump.

In FIGS. 1 and 3, during startup the pump 33 is actuated, closing the valve 30 and depleting the fluid cavity and associated piping of sufficient air to cause fluid 29 to rise into the convertor, filling the fluid cavity 22. The fluid 29 is heated by solar radiation and leaves the collector warmer than when it entered. The cellular structure 25 reduces fluid heat loss by suppressing convection and radiation. The insulation 10 reduces heat loss by conduction. In event of no-flow condition, valve 30 opens causing the fluid to drain from the collector, preventing thermal overload and resultant drainage. In event of fluid boiling, flow ceases and the fluid drains.

FIG. 4 is a schematic view of a system embodying the invention.

During system startup, pump 55 draws liquid from main storage tank 53, to fill duct 40 and accumulator 41. As the liquid covers the convertor inlet duct 31 air is drawn from convertor fluid path 22 and outlet duct 34, as check valve 47 is closed, preventing outside air from entering auxiliary storage tank 48 or main storage tank 53 through interconnecting duct 49. Air is removed from convertor liquid path 22 and associated ducting communicating convertor liquid path 22 with accumulator 41, auxiliary storage tank 48, and main storage tank 53. The air removed is proportional to the amount of liquid drawn from main storage tank 53 by pump 55. After sufficient volume of air has been withdrawn from liquid path 22 and associated ducting, to allow liquid from accumulator 41 to fill liquid path 22 and associated ducting, liquid will then flow from accumulator 41, through converter circuit to auxiliary storage tank 48, with pressure in the converter liquid path 22 being negative with respect to atmospheric pressure. The valve 45 cannot be fully closed, but may be used to control liquid flow rate in the convertor path 22. A liquid level sensor 42 may be used to control the amount of liquid in accumulator 41 by controlling the speed of pump 55, by pass valve 56 or other suitable means. In the event of a normal system shutdown, vent 43 admits air to accumulator 41 to allow liquid drain back through pump 55 to main storage tank 53 and also permits liquid drainage from convertor liquid path 22 through duct 34 to auxiliary storage tank 48. In the event of a system malfunction in which liquid flow in convertor liquid path 22 is so reduced as to allow sufficient boiling of the liquid, the resultant gaseous phase serves to break the siphon in path 22 and assure drainage.

The system shown in FIG. 4 may also include, but is not restricted to, such addition as heat pipe 52, which may serve to allow heat liquid in tank 53 to transfer heat to the liquid in tank 48 but preventing heat from liquid in tank 48 from being transferred to tank 53, auxiliary heaters 50 and 54, heat exchanger 51, safety valve 46, and additional devices.

Figure 5:
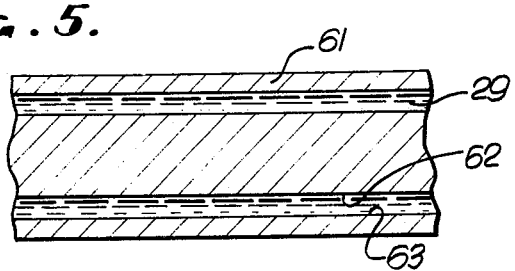
FIG. 5 is an additional example of a converter which could be used in the invention.
Figure 6:
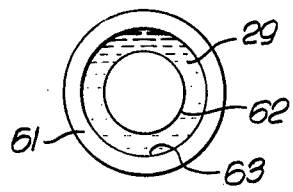
FIG. 6 is an end view of FIG. 5.

FIG. 5 shows an example of a non-planar converter which could be used with the present invention. Cover 51 may be a transparent cylinder for passing solar radiation to the liquid 29 which is confined between surfaces 52 and 53 and may flow therein. The cover 51 and surfaces 52 and 53 may be joined in any suitable manner to permit flow.

Addition means to insure convertor thermal overload protection include the use of solar energy absorptive liquid that becomes transparent above a certain temperature, the use of a phase change material to absorb excess collector heat, and ability to draw air through convertor fluid path by thermosiphon during periods of inoperation.

The convertor may be constructed of floating and or compliant components to reduce problems associated with manufacturing tolerances, thermal expansion, assembly, and maintenance. The convertor outer cover may be made of an ultraviolet radiation absorptive material, to allow wider choice of interior materials.

We claim:

1. In a solar energy conversion system the combination comprising
   (a) a solar convertor in which absorptive liquid absorbs solar radiation, the liquid being solar energy absorptive, the convertor including a container having upper and lower manifolds and liquid passage means inclined linearly upwardly between the manifolds substantially throughout the entire extent of said passage means,
   (b) first means to circulate said liquid for flow through the convertor, to maintain said liquid passage means in the convertor at sub-atmospheric pressure,
   (c) means to admit atmospheric pressure air to said liquid passage means to effect drainage of liquid from the convertor in response to an undesirable operating condition in said system, and thereby to prevent convertor overheating, said first means located to permit such drainage, and
   (d) the convertor including a light reflective surface substantially totally covered by the absorptive liquid in operation of said system, and uncovered when the liquid is removed from the convertor to prevent overheating thereof, said surface being extended and adjacent said liquid passage means.

2. The combination of claim 1 wherein said convertor comprises a base with said extended surface thereon to face frontwardly toward the sun, said surface being reflective to solar radiation, and located rearward of the path of said liquid.

3. The combination of claim 2 wherein the convertor includes light passing structure located forwardly of said path.

4. The combination of claim 3 wherein said structure is transparent to solar radiation to reduce energy loss from said liquid.

5. The combination of claim 3 wherein said structure includes a cellular layer.

6. The combination of claim 1 wherein said liquid is visibly dark.

7. The combination of claim 2 wherein said base is insulative and extends peripherally of said structure.

8. The combination of claim 1 wherein said first means includes liquid reservoir, and ducting communicating reservoir with an inlet and outlet defined by the convertor system.

9. The combination of claim 8 wherein said first means includes a pump in communication with said ducting.

10. The combination of claim 1 wherein said first means includes a main reservoir for said liquid, a pump operatively connected between the reservoir and the lower of said manifolds to supply said liquid to said lower manifold to rise in the converter to said upper manifold, and a siphon connection between the upper manifold and said reservoir.

11. In a solar energy conversion system the combination comprising
    (a) a solar convertor in which absorptive liquid absorbs solar radiation, the liquid being solar energy absorptive, the converter including a container having upper and lower manifolds and liquid passage means inclined linearly upwardly between the manifolds substantially throughout the entire extent of said passage means,
    (b) first means to circulate said liquid for flow through the convertor, to maintain said liquid passage means in the convertor at sub-atmospheric pressure,
    (c) means to admit atmospheric pressure air to said liquid passage means to effect drainage of liquid from the convertor in response to an undesirable operating condition in said system, and thereby to prevent convertor overheating, said first means located to permit such drainage, and
    (d) the convertor including a light transmitting surface substantially totally covered by the absorptive liquid in operation of said system, and uncovered when the liquid is removed from the convertor to prevent overheating thereof.

12. The combination of claim 11 wherein said convertor includes tubing defining said liquid passages, and which is transparent to solar radiation when liquid is removed from the convertor by drainage therefrom.

* * * * *